UNITED STATES PATENT OFFICE.

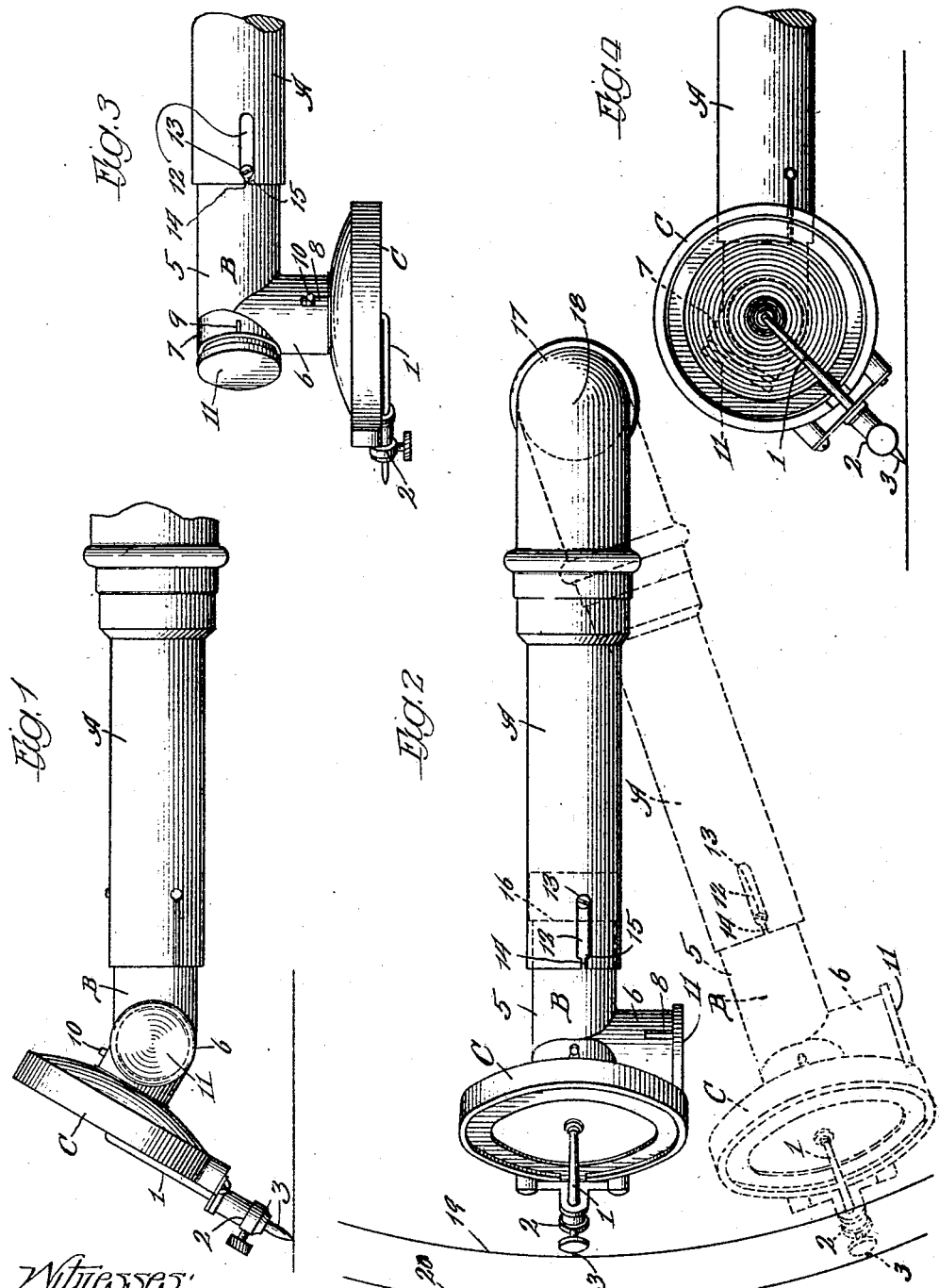

ARCHIE E. PARNALL, OF CHICAGO, ILLINOIS, ASSIGNOR TO FRANK W. WILLIAMS, OF CHICAGO, ILLINOIS.

CONVERTIBLE SOUND-BOX.

1,198,265.  Specification of Letters Patent.  Patented Sept. 12, 1916.

Application filed March 22, 1915.  Serial No. 16,282.

*To all whom it may concern:*

Be it known that I, ARCHIE E. PARNALL, a citizen of the United States, residing at Chicago, in the county of Cook and State of Illinois, have invented new and useful Improvements in a Convertible Sound-Box, of which the following is a full, clear, concise, and exact description, reference being had to the accompanying drawing, forming a part of this specification.

My invention relates to improvements in attachments for talking machines with specific reference to convertible sound boxes, and has for its object the production of a device by means of which the same sound box may be readily and quickly adjusted to play a record of the "hill and dale" type or one of the "laterally undulating groove" type.

A further object is the production of a device that may be readily and quickly attached to a machine, that consists of the minimum number of parts, can be cheaply constructed and not liable to get out of order.

These and such other objects as may hereinafter appear are obtained by my device, an embodiment of which is illustrated in the accompanying drawings, in which—

Figure 1 represents a side elevation of my device in connection with a reproducer or sound box and a portion of the sound conduit or arm of a talking machine, showing my device in position to operate on a record of the "hill and dale" type; Fig. 2 represents a top plan view of Fig. 1 showing the entire sound conduit and also showing a different position of the reproducer or sound box; Fig. 3 represents a top plan view similar to Fig. 2, but showing the reproducer or sound box in position to operate on a record disk of the "laterally undulating groove" type; and Fig. 4 represents a side elevation of Fig. 3.

Like numerals of reference refer to like parts in the several figures of the drawings.

Referring now to the drawings A represents a sound conduit; B represents my improved connecting member, and C a reproducer or sound box, the reproducer having an ordinary needle arm 1, a needle support 2 and a needle 3. The sound box also is provided with a rearwardly extending tube adapted to fit in either one of the openings in the member B. This member B, above referred to, comprises substantially an elbow pipe or tube having a body or main portion 5, a side member 6 and an end member 7, the side member 6 extending at right angles to the body or main member 5, and the member 7 being bent upwardly as shown clearly in Fig. 4; the purpose of this being that this angle is best adapted to retain the sound box in proper position when in use on the machine. The member 6 is slotted, as shown at 8, and the member 7 is slotted at 9, these slots being adapted to engage a pin 10 mounted on the engaging end 4 of the sound box and serving to hold the reproducer or sound box against lateral motion when the reproducer is slipped in place within the open tubes. A cap 11 is provided adapted to fit in or over the open end of the member B; that is the end that remains open when the reproducer is in operative position, the purpose being to prevent any escape of the sound which enters through the member B and into the sound conduit or arm A. The sound conduit or arm A is provided with a plurality of slots shown at 12 and the member B is provided with a screw hole within which is mounted a screw 13 holding the member B in sliding connection with the arm A. The slots 12 narrow at their extreme outer end as shown at 14, thus making it impossible for the member B to slip off of the arm as the screw 13 would strike against the constricted portion of the groove at 15. The member B is preferably provided with a slight shoulder, as shown at 16, providing for a snug fit within the sound conduit.

Referring now to Fig. 2 it will be noted that the inner end of the arm or conduit is provided with a universal joint at 17, thus permitting the arm to travel horizontally and vertically. The arm consequently revolves about a center 18, and reference to Fig. 2 shows that with the sound box in the position indicated in full lines the circumference of the circle over which the needle travels is indicated at 19. It will be noted that in this position the sound box mounted on the member B is slipped into the sound conduit A as far as it can go, further movement being prevented by the engagement of the screw 13 against the end of the groove.

When the reproducer is in the position shown in Figs. 3 and 4, the circumference of travel of the needle point is over the same line 19, as shown in full lines; the member B, however, being slipped out and occupying the position shown in dotted lines in Fig. 2. When the sound box is taken off with the arm in that position and replaced on the bent up end it is first in the position shown in the dotted lines in Fig. 2, the circumference of travel then being along the line 20. In order to give the needle point the same radius in all cases, the reproducer and the member B are slipped back into the position shown in full lines in Fig. 2. It will thus be seen that by reason of this adjustable feature the reproducing needle is made to travel over the same circumference regardless of the position the sound box occupies with respect to the member B.

In Fig. 2 I have shown the cap 11 on the end of the open member 6, while in Fig. 3 it is shown on the end of the member 7; the idea being that at all times when the machine is being played the cap must be in position over the open end.

The necessity for a device of this character is well understood by reason of the fact that there are two well recognized types of records that are used interchangeably on machines. The Edison disk record is of the type known as the "hill and dale", meaning that the bottom of the record groove on which the sound is recorded is undulatory in form, the various modifications and characteristics of the sound being recorded vertically in the material at the bottom of the groove. In the other type of disks, known as the Columbia or Victor the record is made on the side of the groove and the needle vibrates horizontally while the sound is recorded or reproduced, while in the former case the vibration is vertical. In both cases, however, the arm with the reproducer or recorder is moved toward the center of the disk by the revolution of the disk itself, the needle engaging the spiral groove of the record. The existence of these conditions makes it essential that the sound arm of a machine be fitted in such a manner as to permit the playing of these different types of records and also fitted in such a manner as to permit ready and accurate adjustment of parts. These results, it will be seen, are accomplished by the use of my improved device as it only requires an instant to remove the reproducer from the side member when it has been used in playing a Victor record, as shown in Fig. 3, and transfer it to the position shown in Fig. 1 ready to play an Edison record.

A device of this character is extremely valuable in that it increases the capacity of the machine and makes available to the owner of a single machine all of the records of these types on the market.

While I have shown a very simple embodiment of my device it is evident that modifications might be made and accomplish similar results by other means, but any such means would be well within the scope of my invention.

Having thus described my invention what I claim as new and desire to secure by Letters Patent is:—

1. A reproducing machine comprising a swinging tubular tone-arm, a sound-box having a diaphragm and a tubular portion connected therewith and means for connecting said sound-box to said tone-arm comprising a member having three communicating tubular portions, the first of said portions telescopically engaging said tubular tone-arm, the second tubular portion inclined upwardly and outwardly with respect to the axis of said tone-arm, and the other tubular portion extending substantially horizontally and laterally with respect to said first tubular portion, said second tubular portion being constructed to engage the tubular portion of the sound-box to hold the sound-box in inclined position with its diaphragm extending transversely to the axis of the tone arm for use with a "hill and dale" record, and said third portion being constructed to engage the tubular portion of the sound-box to hold the sound-box with its diaphragm in a plane substantially parallel to the axis of the tone-arm for use with a laterally undulating groove record.

2. A reproducing machine comprising a swinging tubular tone-arm, a sound-box having a diaphragm and a tubular portion connected therewith, and means for connecting said sound-box to said tone-arm comprising a member having three communicating tubular portions, the first of said portions telescopically engaging said tubular tone-arm, the second tubular portion inclined upwardly and outwardly with respect to the axis of said tone-arm, and the other tubular portion extending substantially horizontally and laterally with respect to said first tubular portion, said second tubular portion being constructed to engage the tubular portion of the sound-box to hold the sound-box in inclined position with its diaphragm extending transversely to the axis of the tone-arm for use with a "hill and dale" record, and said third portion being constructed to engage the tubular portion of the sound-box to hold the sound-box with its diaphragm in a plane substantially parallel to the axis of the tone-arm for use with a laterally undulating groove record, the first tubular portion of said connecting means being slidably adjustable with respect to the tone-arm.

In witness whereof I have hereunto subscribed my name.

ARCHIE E. PARNALL.